United States Patent
Kasuu et al.

(10) Patent No.: US 6,854,293 B2
(45) Date of Patent: Feb. 15, 2005

(54) METHOD FOR FUSION SPLICING OF OPTICAL FIBERS

(75) Inventors: Osamu Kasuu, Yokohama (JP);
Motonori Nakamura, Yokohama (JP);
Tomomi Sano, Yokohama (JP);
Tomomi Moriya, Yokohama (JP);
Shinji Kayou, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 517 days.

(21) Appl. No.: 10/068,852

(22) Filed: Feb. 11, 2002

(65) Prior Publication Data

US 2002/0157424 A1 Oct. 31, 2002

(30) Foreign Application Priority Data

Feb. 23, 2001 (JP) .................................. 2001-048500

(51) Int. Cl.[7] ..................... C03B 37/15; G02B 6/255
(52) U.S. Cl. ................................ 65/407; 385/96
(58) Field of Search ........................ 65/407; 385/95–98

(56) References Cited

U.S. PATENT DOCUMENTS

| | | | | |
|---|---|---|---|---|
| 4,557,556 A | * | 12/1985 | Decker, Jr. .................. | 385/140 |
| 4,948,412 A | * | 8/1990 | Yamada et al. ................ | 65/377 |
| 6,120,192 A | | 9/2000 | Krause | |
| 6,178,779 B1 | * | 1/2001 | Drouart et al. ................ | 65/391 |
| 6,799,903 B2 | * | 10/2004 | Saito et al. .................... | 385/96 |
| 2004/0091219 A1 | * | 5/2004 | Christensen et al. .......... | 385/96 |

FOREIGN PATENT DOCUMENTS

| | | | | | |
|---|---|---|---|---|---|
| JP | 64066071 A | * | 3/1989 | ............ | B23K/9/08 |
| JP | 01284806 A | * | 11/1989 | ............ | G02B/6/24 |
| JP | 05072439 A | * | 3/1993 | ............ | G02B/6/30 |
| JP | 11-305085 | | 11/1999 | | |
| JP | 2000098171 A | * | 4/2000 | ............ | G02B/6/255 |
| JP | 2003315599 A | * | 11/2003 | ............ | G02B/6/255 |

* cited by examiner

*Primary Examiner*—Peter Chin
*Assistant Examiner*—Carlos Lopez
(74) *Attorney, Agent, or Firm*—McDermott Will & Emery LLP

(57) ABSTRACT

A method of fusion-splicing optical fibers having different mode field diameters or small mode field diameters is provided, which method is advantageous in that the splicing loss is smaller. The method comprises a fusion splicing process in which fusion splicing is performed by butting end faces of two optical fibers together and a heat treatment process in which the fusion spliced part of the optical fibers and the vicinity thereof are heated. The heat treatment process is performed by moving an arc heating unit in a direction other than the Y-axis direction (a direction perpendicular to the Z-axis direction and the opposing direction of arc electrodes) and Z-axis direction (the axial direction of the optical fiber), via the fusion spliced part in a Y-Z plane formed by the Y-axis direction and Z-axis direction.

3 Claims, 3 Drawing Sheets

METHOD FOR FUSION SPLICING OF OPTICAL FIBERS

BACKGROUND OF THE INVENTION

1. Field of the Invention

The present invention relates to a method for fusion splicing optical fibers, and an optical fiber transmission line obtained by the method. More particularly, the method includes a fusion splicing process in which fusion splicing is performed by butting the end faces of two optical fibers together and a heat treatment process in which a fusion-spliced part and the vicinity thereof are heated.

2. Description of the Background Art

In the case of optical fibers having smaller or different mode field diameters, fusion splicing is performed by butting end faces of two optical fibers, and the fusion spliced part and the vicinity within several mm of both sides thereof are subjected to heat treatment such that a dopant in the optical fibers is diffused so as to decrease the differences in the refractive index profiles of the fusion spliced part and thereby lessening the splicing loss.

The heat source of a heating unit used in the heat treatment process is generally a plurality of micro burners arranged suitably in relation to the optical fibers. The heating unit must be prepared in addition to an arc unit used for fusion splicing. If the arc unit is also used for heat treatment of optical fibers, a fusion splicing process and a heat treatment process could be done with one unit. However, it is difficult to adjust the heating amount by the discharge electric current itself because it is essential to provide the arc unit with an electric current that is larger than a trigger electric current with which the puncture of the air insulation occurs. It is possible to consider adjusting the amount of heat by performing electric discharge while shifting the position of the arc heating along the optical fiber. It is necessary to make the highest diffusion of the dopant at the fusion-spliced part, decreasing the degree of such diffusion gradually as the location is more distanced from the fusion-spliced part. However, such heat treatment method has a disadvantage in that an excessive heating easily occurs at a turning point because the movement stops at each turn, which results in excessive diffusion of the dopant at the turning point of the movement that is distanced from the fusion-spliced part. In consequence, the optical loss of the optical fibers is increased, causing an increase in the splicing loss.

SUMMARY OF THE INVENTION

An object of the present invention is to provide a method of splicing optical fibers that is advantageous in terms of smaller splicing loss. In order to achieve this object, the method of splicing optical fibers according to the invention comprises a fusion splicing process in which fusion splicing is performed by butting the end faces of two optical fibers together and a heat treatment process in which the fusion spliced part of the optical fibers and the vicinity thereof are heated. A heating unit used for the heat treatment process is an arc heating unit having a pair of opposing arc electrodes, an optical fiber being placed between them. The heat treatment of an optical fiber is performed by shifting the heating center position of the arc electrodes by a relative movement with respect to the optical fiber in a direction other than Y-axis direction (a direction perpendicular to both Z-axis direction and the opposing direction of the arc electrodes) and Z-axis direction (the axial direction of the optical fiber), via the fusion spliced part in a Y-Z plane which is formed by the Y-axis direction and Z-axis direction.

In one embodiment of the invention, the direction of the movement of the heating center position has an inclination of 20° to 45° relative to the axial direction of the optical fiber (Z-axis direction). When the heating center position passes the fusion-spliced part, the movement of the heating unit is stopped once while heating is continued, and the heating center position except for the fusion-spliced part may be 2 mm or more distanced from the axis of the optical fiber during the time in which the movement of the heating unit is stopped once. Also, the movement course may be a straight line having an inclination to the direction of the optical fiber.

An optical transmission line is also provided in which the fusion splicing of two optical fibers is performed by the above-mentioned method.

The present invention is further explained below in reference to the accompanying drawings. The drawings are provided solely for the purpose of illustration and are not intended to limit the scope of the invention.

DETAILED DESCRIPTION OF THE INVENTION

Figure 1A:
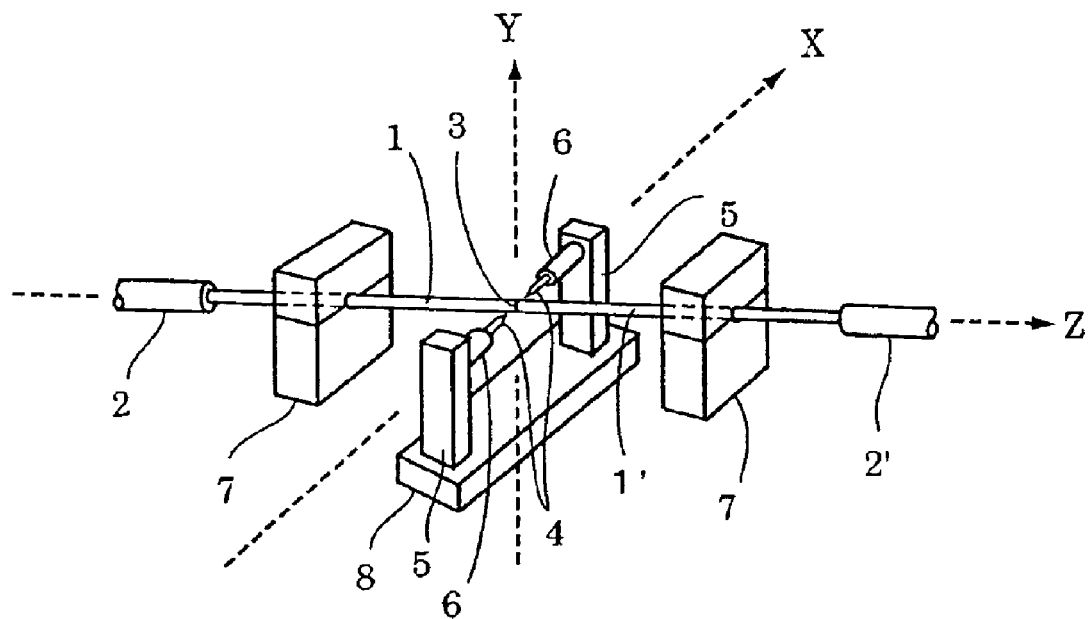
FIG. 1A is a perspective view showing a main part of an arc heating unit used in a heat treatment process of the present invention.

Embodiments of the present invention are explained below by referring to the accompanying drawings. In the drawings, the same number bears the same sign so that duplicated explanation can be avoided. The ratios of the dimensions in the drawings do not necessarily coincide with the explanation.

In FIGS. 1A through 1C, 1 and 1' indicate the exposed portions of the optical fibers, in which the coatings of the optical fibers are removed, and 2 and 2' indicate optical fibers, 3 a fusion-spliced part, 4 arc electrodes, 5 electrode support stands, 6 an atmospheric gas exhaust pipes, 7 optical fiber holding stands, and 8 an electrode carrier, respectively. Also, the direction of the opposing arc electrodes is indicated as X-axis, and the longitudinal axis of the optical fiber at the fusion-spliced part is indicated as Z-axis, and a direction perpendicular to the X-axis and the Z-axis is indicated as Y-axis.

The exposed portion 1 and 1' of the optical fibers consist of silica glass, respectively, around which a UV-cured resin is provided such that optical fibers 2 and 2' are formed. Since the mode field diameters of the optical fibers 2 and 2' are different, or small if they are the same, simply fusion splicing the optical fiber 2 and the optical fiber 2' causes a large splicing loss.

For fusion splicing the optical fiber 2 and the optical fiber 2', first, the coating of each end portion is removed to obtain the exposed portions 1 and 1' of the optical fiber, and the tips thereof are cut to have a mirror-like surface, butted together, and fusion spliced together by an arc discharge of the fusion splicing unit.

In a state immediately after the fusion splicing, the refractive index profiles of the optical fiber 2 and the optical fiber 2' are discounting at the fusion spliced part 3. That is, when their mode field diameters are different, the mode field diameters change abruptly even if the center of each core agrees. Also, when the mode field diameters are small, it is difficult to match the center of each core exactly although it is necessary to do so. Therefore, the splicing loss is large immediately after the fusion splicing. For example, a single-mode optical fiber having a mode field diameter of about 12 μm, which is comparatively large, and a dispersion compensating optical fiber having a mode field diameter of about 4 μm–5 μm, which is comparatively small, are fusion spliced together, the splicing loss is about 1.35 dB at the 1.55 μm wavelength immediately after the fusion-splicing.

Therefore, heat treatment is performed at the fusion spliced part 3 of the optical fiber and the vicinity thereof in the following manner. As shown in FIG. 1A, an electrode support stand 5, which supports an arc electrode 4, is mounted on an electrode carrier 8. Also, since the electrode carrier 8 is equipped with a 3-axis driving unit for X-axis, Y-axis, and Z-axis, it is possible to let the heating center position between the two arc electrodes 4 move in a desired direction. It is possible to let the heating center position move along the optical fiber by having the driving unit drive in the Z-axis direction. If Z-axis drive and Y-axis drive are performed at the same time, the heating center position can be made to move in a direction in the Y-Z plane.

Figure 1B:
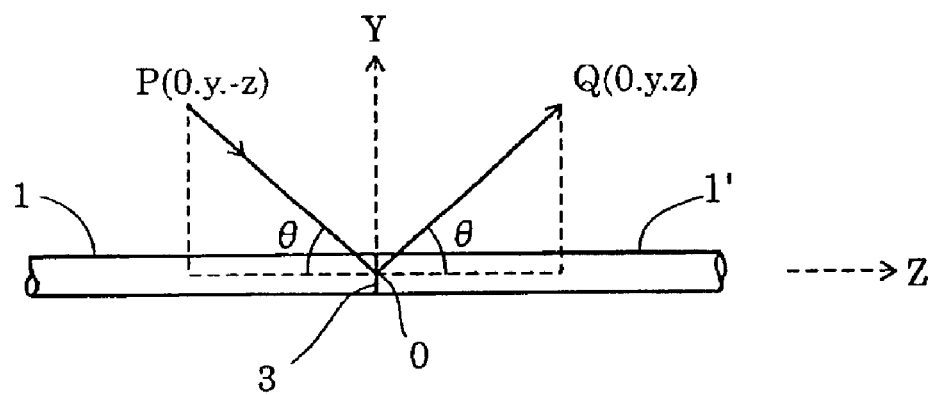
FIGS. 1B and 1C are front views each illustrating a movement course of the heating center position in a method for fusion splicing the optical fibers according to the present invention.
Figure 1C:
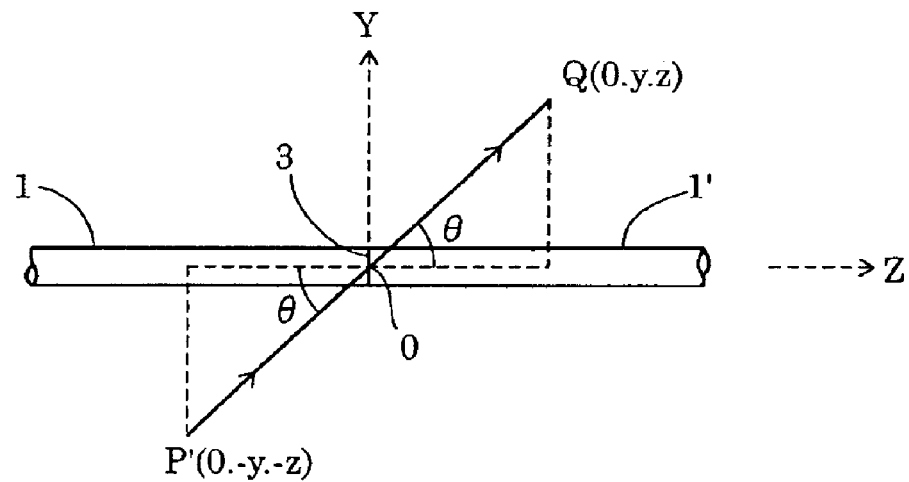

During the heat treatment process of the fusion splicing of optical fibers by the method of the present invention, the heating center position is shifted in a course such as describe in the following, while an arc discharge is performed using the arc electrodes 4 which are mounted on an electrode carrier 8. FIG. 1B and 1C are front views respectively showing an example of the movement course of the heating center position, FIG. 1B showing an example of V-form movement and FIG. 1C showing an example of a straight line movement. First, in the example of FIG. 1B, while performing an arc discharge between arc electrodes 4, the driving of the electrode carrier 8 is performed in Y-axis and Z-axis directions at the same time, and the heating center position is moved in the order of Point P (0, Y, −Z)→Point O (0, 0, 0)→Point Q (0, Y, Z). Assuming that the angles formed by a segment PO and the Z-axis, and a segment OQ and the Z-axis are θ, respectively, there is the relationship: tan (θ)=Y/Z.

For example, θ my be about 20°–45° in the case of fusion-splicing a single-mode optical fiber having a mode field diameter of about 12 μm and a dispersion compensating optical fiber having a mode field diameter of about 4 μm–5 μm and performing heat treatment thereat. This allows the mode field diameter to decrease gradually as it is more distanced from the fusion spliced part. Also, the distance between the arc electrodes is about 3 mm and the extent of a high temperature zone at the center of the arc discharge is about 1 mm to 2 mm in diameter. Hence it is preferable to set Y to 2 mm or more so as to prevent the high temperature zone from overlapping the optical fiber when the heating center position comes to Point P and Point Q. Also, Z is preferably determined according to a difference in the mode field diameter: Z should be large when the difference in the mode field diameter is large.

Figure 2:
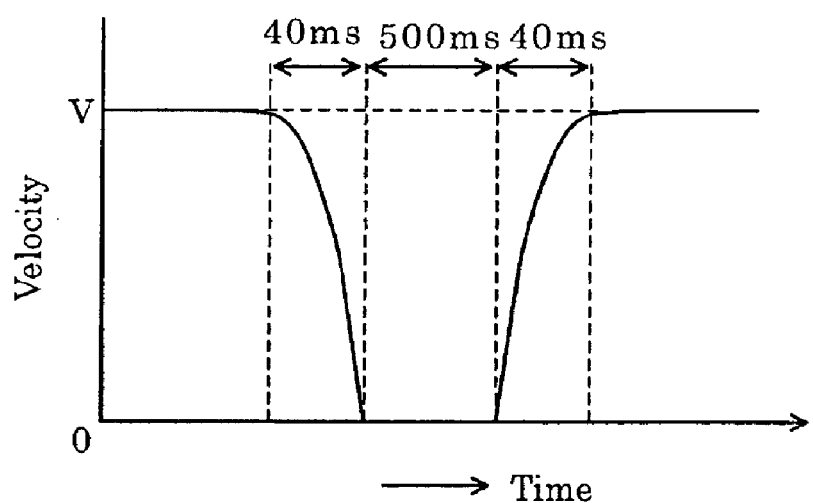
FIG. 2 illustrates the velocity of the heating center position before and after the stoppage of the movement.

The arc discharge is performed with a constant electric current, and the arc electrodes are moved at a constant velocity. However, in the case of FIG. 1B, their movement is stopped once in order to change the direction of the movement at Point O. The driving system of the electrode carrier 8 is controlled by a computer in a control unit (not illustrated). Because of timing by General Purpose Interface Bus (GPIB) and the backlash of the driving system, the velocity of the arc electrode movement before and after the stoppage becomes as shown in FIG. 2, and the period during which the arc electrodes cannot be moved at a constant velocity is about 580 ms, including a decelerating time, stoppage time, and accelerating time.

Because heating by the discharge is continued during such period, the heating at Point O progresses more than at other points. However, such long heating is advantageous for decreasing the discontinuity of the mode field diameter because Point O is a fusion-spliced part at which the mode field diameter is discontinuous and which needs heating most. Preferably, the heat treatment work is conducted with heating temperatures of the arc discharge lowered at the vicinity of the heating part during the arc discharge by spouting an inert gas, such as argon gas, from an atmospheric gas exhaust pipe 6 that is provided concentrically relative to the arc electrodes 4. A housing may be provided to cover the whole heating unit.

When heat treatment is performed while shifting the heating center position along the course shown in FIG. 1B, Points P and Q where the stoppage occurs due to the turn except for the fusion spliced part O are distanced from the optical fiber, the problem of excessive heating at the optical fiber does not occur. Because the distance between the heating center position and the optical fiber also becomes longer as the heating center position is distanced from the fusion spliced part, the heating of an optical fiber decreases gradually and the spread of a dopant also decreases. Accordingly, it is possible to change the diffusion degree of the dopant successively. Thus, an optical fiber with a fusion splicing part having a small splicing loss can be obtained.

In the example of FIG. 1C, while performing an arc discharge between the arc electrodes 4, the heating center position is shifted in the order of Point P' (0, −Y, −Z)→Point O (0, 0, 0)→Point Q (0, Y, Z) by performing the driving of the electrode carrier 8 in both Y-axis and Z-axis directions at the same time. The movement of the arc electrodes is stopped once at Point O, and the electrodes move at a constant velocity except for Points O, P', Q. Also, the arc discharge is performed by applying a constant electric current. In this manner, the heat treatment in the case of FIG. 1C can be made equal to that of FIG. 1B. In contrast with the movement course of FIG. 1B which is a V-form, the movement course of FIG. 1C is a straight line. Therefore, in the case of FIG. 1C, the composition of the electrode carrier 8 can be simplified because a needed performance can be achieved with one driving axis just by adjusting the direction of the driving axis of the driving system of the electrode carrier 8 to the direction of a straight line beforehand.

In the method described above, the arc electrodes are mounted on the electrode carrier and moved while the fusion-spliced optical fiber is fixed. However, the optical fiber holding stands that support an optical fiber may be mounted on a movable carrier, and the optical fiber may be moved. Also, an arc unit used for fusion splicing may be used for heat treatment, but another arc unit may be used for heat treatment, because there are differences in the control systems between a unit used for fusion splicing and a unit used for heat treatment.

Figure 4:
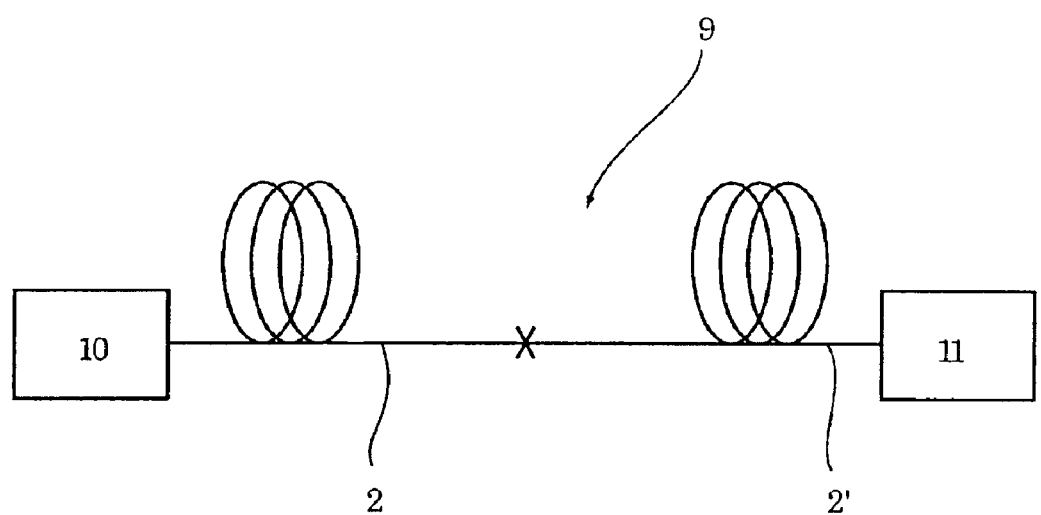
FIG. 4 illustrates an embodiment of an optical fiber transmission line according to the present invention.

FIG. 4 schematically shows an optical transmission line 9 comprising the optical fibers 2 and 2' that are spliced together in accordance with the method described above. The X mark indicates the connection point. The optical transmission line 9 is provided between a transmitter 10 and a receiver 11.

EXAMPLE

The end faces of a single-mode optical fiber whose mode field diameter was about 12 μm and a dispersion compensating optical fiber whose mode field diameter was about 4 μm–5 μm were butted and the fusion splicing of the two optical fibers was performed. The splicing loss was measured upon fusion splicing. After that, heat treatment was performed by moving the arc electrodes at the movement velocities and in the running patterns shown in Table I. The movement courses of Example 1 and Example 2 were respectively those shown in FIG. 1B, and the movement course of Comparative Example 1 was that shown in FIG. 3. The splicing losses in the respective examples were measured each time when the heating center position returned to Point O. Also, the discharge was continued while the movement was stopped, and the time needed for stoppage was about 580 ms including the decelerating time, stop time, and accelerating time. The discharge electric currents between the arc electrodes 4 in Example 1, Example 2, and Comparative Example 1 were 13 mA, and during the heat treatments, the vicinity of the heating part was provided with an atmosphere of argon gas by flowing argon gas from the atmospheric gas exhaust pipe 6 at the flow rate of 300 milliliter-per-minute.

The results of measurement of the splicing losses at the 1.55 μm wavelength are as shown in Table I.

TABLE I

Figure 3:
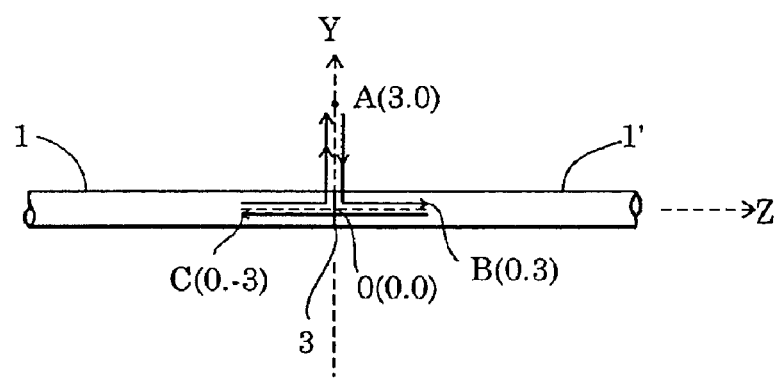
FIG. 3 is a front view illustrating a movement course of the heating center position in Comparative Example 1.

|  |  | Example 1 | Example 2 | Comparative example |
|---|---|---|---|---|
| Velocity (mm/s) | $V_y$ | 3 | 3 | 3 |
|  | $V_z$ | 3 | 5 | 3 |
| Pattern |  | FIG. 1A | FIG. 1B | FIG. 3 |
| Loss (dB) | before heating | 1.35 | 1.35 | 1.35 |
|  | $1^{st}$ | 0.20 | 0.22 | 2.00 |
|  | $2^{nd}$ | 0.15 | 0.17 | over 20 |
|  | $3^{rd}$ | 0.12 | 0.14 | over 20 |

As can be understood from Example 1 and Example 2, the splicing losses were reduced from 1.35 dB, which is the value before heat treatment, to about 0.12 dB–0.14 dB by performing heat treatments about three times (one and half round-trips) in the movement course shown in FIG. 1B.

The spread of a dopant is too progressive and the splicing loss tends to increase when the heating is done four times or more; hence the heating of about three times is optimal for minimizing the splicing loss. In the case of Comparative Example 1, the splicing loss became 2 dB upon the first heat treatment. This is probably because excessive heating occurred as a result of stoppage at the tmovement at Point B and Point C, and the spread of the dopant was too progressive, allowing the loss to increase there.

What is claimed is:

1. A fusion splicing method for splicing optical fibers, comprising:

a fusion splicing process in which fusion splicing is performed by a butting end faces of two optical fibers together; and a heat treatment process in which the fusion spliced part of the optical fibers and the vicinity thereof are heated, wherein heating in the heat treatment process is performed using an arc heating unit having a pair of opposing arc electrodes, the fusion spliced optical fibers being placed therebetween;

the heating center position of the arc electrodes being shifted by a relative movement with respect to the optical fibers in a direction other than the Y-axis direction, a direction perpendicular to both Z-axis direction and the opposing direction of arc electrodes, and Z-axis direction, the axial direction of the optical fibers, via the fusion spliced part in the Y-Z plane which is formed by the Z-axis direction and Y-axis direction.

2. A fusion splicing method for optical fibers according to claim 1, wherein:

the heat treatment process is performed in a manner such that the heating center position is shifted in a direction having an inclination of 20° to 45° relative to the Z-axis direction; and the heating center position is subjected to a relative movement with respect to the optical fibers when the heating center position is located at a point which is neither the fusion-spliced part nor a point that is 2 mm or more distanced from the axis of the optical fibers.

3. A fusion splicing method for optical fiber according to claim 2, wherein the heating center position is shifted along a straight line which passes the fusion spliced part.

* * * * *